United States Patent [19]

Yoshida

[11] Patent Number: 5,548,624
[45] Date of Patent: Aug. 20, 1996

[54] DESTUFF CIRCUIT FOR ASYNCHRONOUS DIGITAL SIGNALS

[75] Inventor: Norio Yoshida, Tokyo, Japan

[73] Assignee: NEC Corporation, Tokyo, Japan

[21] Appl. No.: 404,286

[22] Filed: Mar. 14, 1995

[51] Int. Cl.[6] ............................................. H04L 7/00
[52] U.S. Cl. .................................. 375/372; 370/102
[58] Field of Search ............................ 375/369, 372; 370/102, 112, 84, 108

[56] References Cited

U.S. PATENT DOCUMENTS

| | | | |
|---|---|---|---|
| 4,397,017 | 8/1983 | Rokugo | 370/102 |
| 5,111,485 | 5/1992 | Serack | 370/102 |
| 5,313,502 | 5/1994 | Nawrocki et al. | 375/372 |
| 5,459,782 | 10/1995 | Volejnik | 375/376 |

FOREIGN PATENT DOCUMENTS 1-188127  7/1989  Japan.

Primary Examiner—Stephen Chin
Assistant Examiner—Huong Luu
Attorney, Agent, or Firm—Sughrue, Mion, Zinn, Macpeak & Seas

[57] ABSTRACT

A destuff circuit is provided with a virtual address counter wherein total number of destuff control pulses for each period T is supposed to be an average number $Y_n$ of actual occurrence averaged over latest nT durations. Read address signals are generated phase-locked with the output of the virtual write address counter.

5 Claims, 4 Drawing Sheets

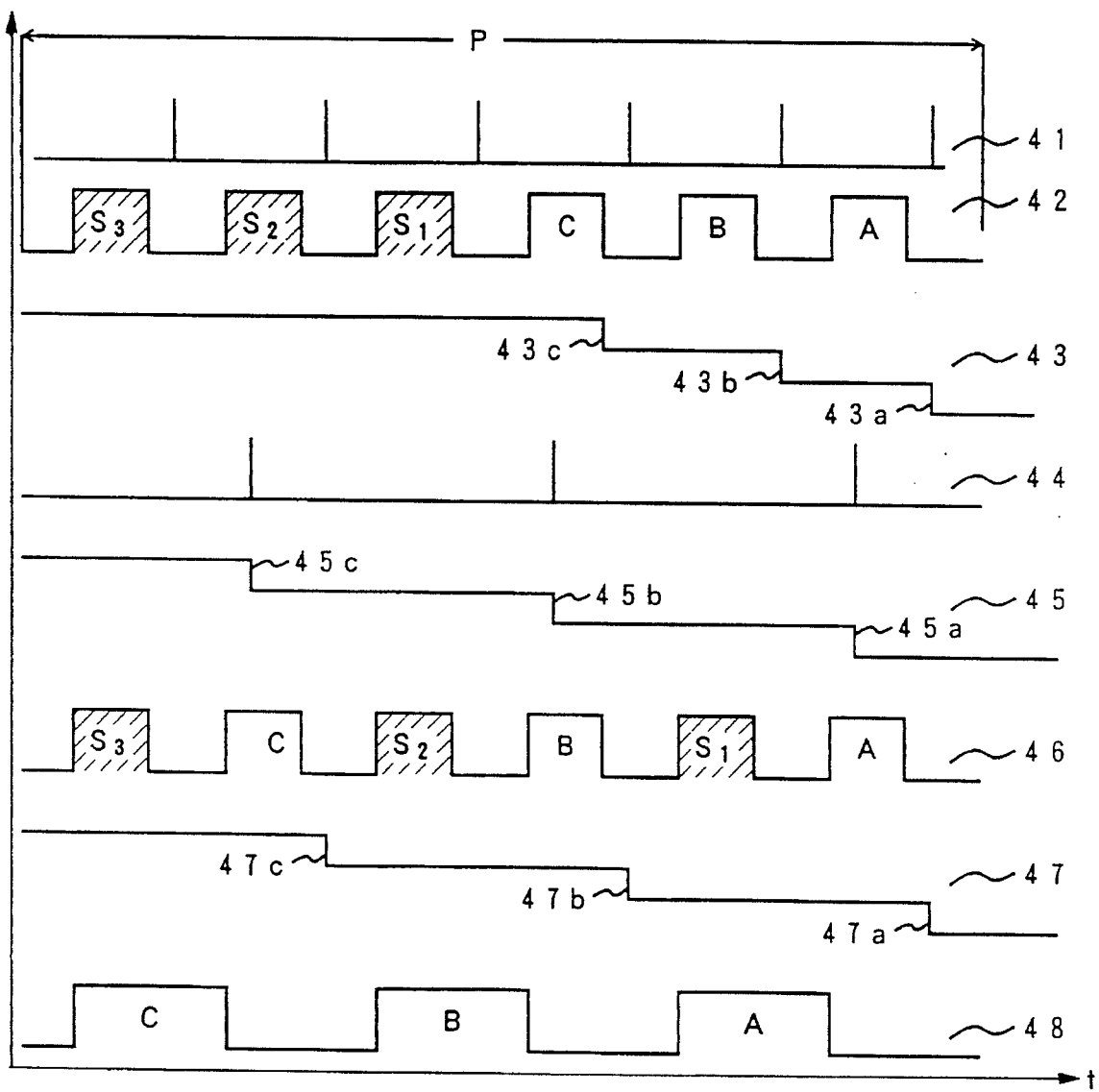

5,548,624

1

DESTUFF CIRCUIT FOR ASYNCHRONOUS DIGITAL SIGNALS

BACKGROUND OF THE INVENTION

This invention relates to a destuff circuit for eliminating stuffed dummy pulses included in received digital signals.

In time-division multiple channel transmission of digital signals, clock frequency of a channel to be transmitted is not generally synchronized to the system clock of the transmission. A buffer memory is provided for synchronizing digital signals of the channel to the system clock of the transmission. The digital signals of the channel are written in the buffer memory at the channel clock frequency. Contents of the buffer memory are read out at the system clock frequency. A data written at an address of the buffer memory is read out with an amount of time lag from the time of writing. As the system clock frequency is selected to be higher than the channel clock frequency, the amount of the time lag decreases as the reading of the buffer memory proceeds. When the amount of the time lag becomes less than a predetermined threshold value, reading of the buffer memory is interrupted and a dummy pulse or a train of dummy pulses is stuffed at the system clock frequency in the transmission signal of the channel.

During the time when stuffed pulses are transmitted, the digital signals of the channel are continually written in the buffer memory, increasing the time lag between the point of writing and that of reading of a data.

This system of stuffing dummy pulses at a transmitting site is called a positive stuffing system(P-stuff). There is another stuffing system called a negative stuffing system(N-stuff). In an N-stuff, channel data are previously stuffed with dummy pulses, and are written in the buffer memory including the stuffed dummy pulses at a writing frequency. The data in the buffer memory are read at a reading frequency which is lower than the writing frequency. The time lag between writing and reading of a data increases as the reading of the buffer memory proceeds. When the amount of the time lag becomes larger than a predetermined threshold, a dummy pulse or dummy pulses in the channel is(are) skipped to decrease the amount of the time lag. In a receiving site, these skipped pulses are reinserted.

Thus, a major difference between P-stuff and N-stuff is in addition or subtraction of dummy pulses, and many circuits used in P-stuff can be equally used in N-stuff with minor modifications. In the following descriptions, the present invention is described as an invention used in P-stuff, but it must be understood that the present invention can also be applied in N-stuff.

In many cases, a data is composed of a byte(a group of eight bits) of data pulses, and one data is stored in the buffer memory at an address of the buffer memory. In these cases, dummy pulses are stuffed in a byte unit. For example, SONET(synchronous optical network) system employs byte unit stuffed pulses for multi-channel synchronous transmission. These stuffed pulses are eliminated at a receiving site, and the received channel is represented by signal pulses uniformly distributed at the original clock frequency of the channel.

The elimination of stuffed pulses at a receiving site and the reproduction of the digital signals at the original clock frequency of the channel is called destuffing. A heretofore known destuffing circuit will be explained in connection with FIG. 3.

2

At a receiving site, received data of a channel, system clock pulses, destuff control signals in the channel are separated from received digital signals. The data of the channel(including stuffed dummy pulses) are delivered on an input data line 11, the system clock pulses are delivered on an input clock line 12, and the destuff control signals of the channel are delivered on a destuff control line 13.

Write address for writing the received data in the buffer memory 30 is generated in a write address counter 16 by the system clock pulses. It will be assumed in the following descriptions that a data is composed of eight data bits(or eight dummy bits) and two service bits, one service bit being a data synchronizing bit and the other service bit being a destuff control bit. Logic ⌈0⌋ of the destuff control bit means that the data is a real data and logic ⌈1⌋ of the destuff control bit means that the data is a byte of stuffed pulses.

Further, it is assumed that the data of the channel received in a bit serial form are converted to a train of data by a series parallel converter(not shown in the drawing), each data being composed of eight parallel pulses, and the train of data is transmitted on the input data line 11 composed of eight parallel lines; and that the clock pulses on the input clock line 12 are address clock pulses generated at a frequency divider(not shown in the drawing) from bit clock pulses extracted from received signals.

When a destuff control signal is a logic ⌈1⌋ signal in a form of a gate pulse, the corresponding address clock pulse is prohibited by gates 14 and 15 from entering in a write address counter 16. And during the gate of the destuff control signal, write enable signal(not shown in the drawing) is disabled.

Thus, the stuffed dummy pulses are eliminated, and the change rate of the output of the write address counter 16, when the change rate is averaged, corresponds to the original clock frequency of the channel before the dummy pulses are stuffed. A VCO(voltage controlled oscillator) 34 generates a train of pulses of a frequency controlled by the output of an LPF(low pass filter) 33. The output of the VCO 34 controls the change rate of the output of a read address counter 31.

A phase detector 32, the LPF 33, the VCO 34, and the read address counter 31 compose a PLL(phase lock loop), and the change rate of the output of the read address counter 31 is controlled to be equal to the average value of the change rate of the output of the write address counter 16. Thus, the contents of the buffer memory 30 are read out on an output data line 35 at the rate of the original clock frequency of the channel.

The destuff circuit of FIG. 3 has problems in jitter elimination. The jitter effect in the destuff circuit of FIG. 3 is shown, in an exaggerated form, in FIG. 4. In FIG. 4, the address clocks on the input clock line 12 are denoted by numeral 41, and the data of the channel are denoted by numeral 42. The data of the channel 42 includes three real data A,B,C which have logic ⌈0⌋ destuff control signals and three stuffed dummy data S1, S2, S3 which have logic ⌈1⌋ destuff control signals in a duration of P.

The output of the write address counter 16 changes as shown by numeral 43, and the three real data A,B,C are written in the buffer memory 30. The address pulses generated from the output of the VCO 34 must be three pulses evenly distributed as denoted by numeral 44 in the time duration P and the output of the read address counter 31 changes as shown by numeral 45. The phase detector 32 detects phase differences between the output change points of the write address counter 16 and the corresponding output change points of the read address counter 31, that is, from 43a to 45a, from 43b to 45b, and from 43c to 45c.

These phase differences are converted to voltage differences usually represented by rectangular voltages of different duration, and high frequency components included in these rectangular voltages are attenuated in the LPF 33 to produce a direct-current voltage for controlling the frequency generated by the VCO 34. But, when the data of a channel are as shown by numeral 42, the output level of the phase detector 32 changes corresponding to the change of the phase differences as denoted by 43a-45a, 43b-45b, 43c-45c. This change of the output level of the phase detector 32 contains relatively low frequency components which are not filtered by the LPF 33. These low frequency components causes jitter in the generated frequency of the VCO 34.

When the stuffed dummy data are uniformly distributed as denoted by numeral 46, the output of the write address counter 16 changes as denoted by numeral 47, the detected phase differences are maintained practically constant as shown by 47a-45a, 47b-45b, 47c-45c. In this progress of phase differences, no low frequency components are included in the detected phase difference and jittering of the generated frequency is eliminated. When the output of the read address counter 31 has no jittering, there is no jittering in the output data on the output data line 35.

Therefore, it will be said that a uniform distribution of stuffed dummy data can prevent jittering of destuffed output pulses. As a prior art of this invention, there is a Japanese patent application entitled "Destuff system" and laid open as a provisional publication No. 188127/'89. In this prior art, two sets of buffer memories are used. In a first buffer memory, data of a channel is written destuffed by a destuff circuit which is similar to the circuit shown in FIG. 3. Then the first buffer memory is read out by read address signals generated by clock pulses having a frequency slightly higher than that of the clock pulses of the channel. The difference of the writing frequency and the reading frequency is compensated by stuffing uniformly distributed dummy signals. The read out data stuffed with uniformly distributed dummy signals are written in a second buffer memory. The second buffer memory is read out by a clock frequency which is precisely synchronized to the channel frequency by a destuff circuit which is similar to the destuff circuit shown in FIG. 3. Since stuffed dummy data are uniformly distributed in the input data of the second buffer memory, there is no jitter in the output data of the second buffer memory.

Thus, the destuff system of the prior art requires two sets of buffer memories for eliminating jitter in the output data, and this is a demerit of the system.

SUMMARY OF THE INVENTION

Therefore, a primary object of the present invention is to supply a destuff circuit which can eliminate jitter in output signals with a single buffer memory. In order to achieve this object, a virtual write address generator is provided for generating virtual write address signals for a virtual data where stuffed dummy data are supposed to be uniformly distributed. Output of the read address counter of this invention is synchronized to the output of the virtual write address generator.

The virtual write address generator in an embodiment of this invention has an averaging circuit for calculating an average number Yn of stuffed dummy data for each period T averaged over nT duration. From T and Yn, change of the output of the virtual write address generator is reproduced. And when the output of the read address counter is synchronized to that of the virtual write address generator, there will be no appreciable jitter in the read address, since stuffed dummy data are uniformly distributed in the virtual write address.

The period T must be selected to be adapted to the actual occurrence of the destuff control signals, and another object of this invention is to provide means for determining adaptive period T. In this invention the period T is controlled by Yn and phase difference between the read address and the write address. When Yn is smaller than expected, T is decreased, and when the phase difference is smaller than expected, T is increased.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

FIG. 4 shows waveforms connected with generation of jittering.

DETAILED DESCRIPTION OF THE PREFERRED EMBODIMENTS

Figure 1:
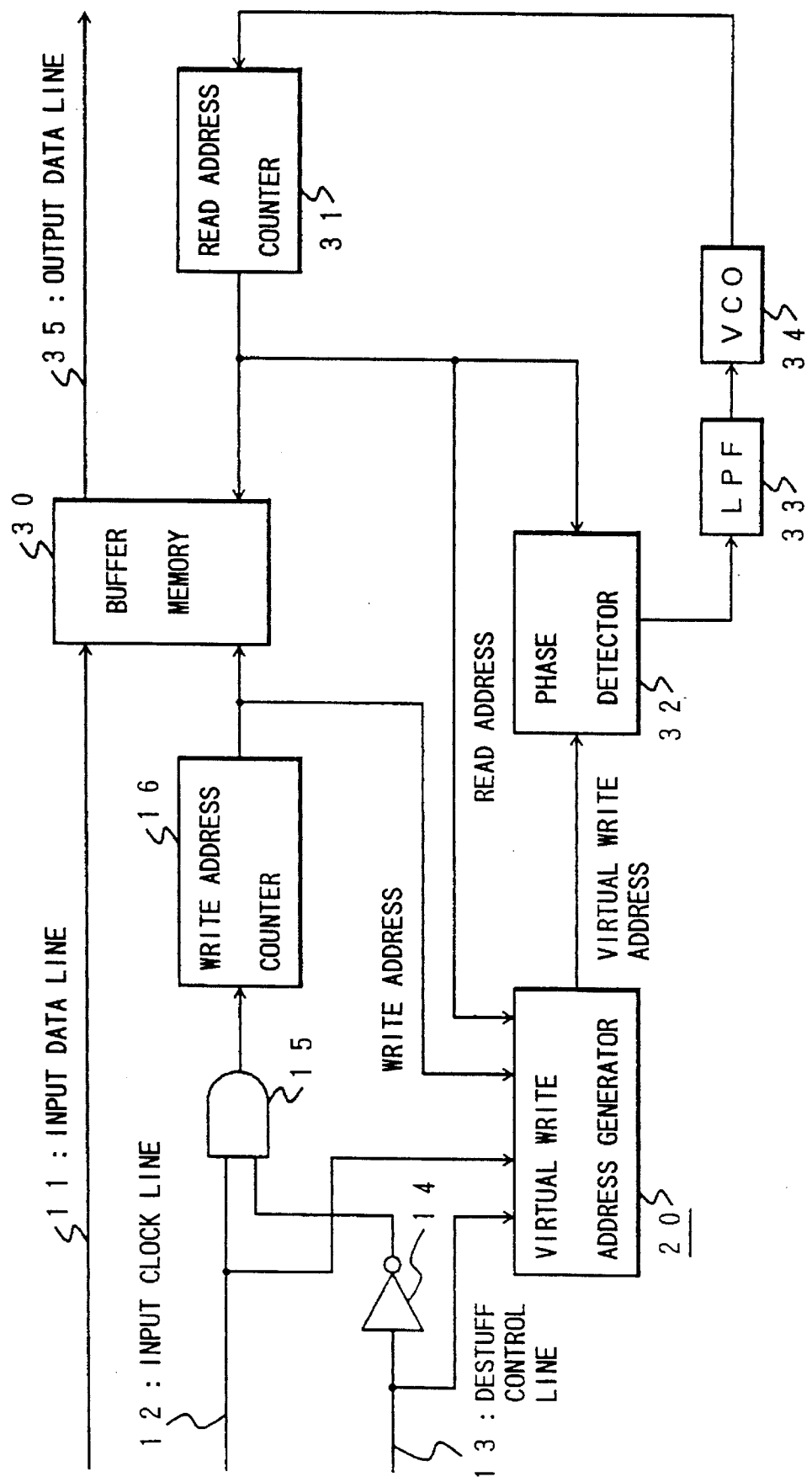
FIG. 1 shows a block diagram of an embodiment of this invention.
Figure 3:
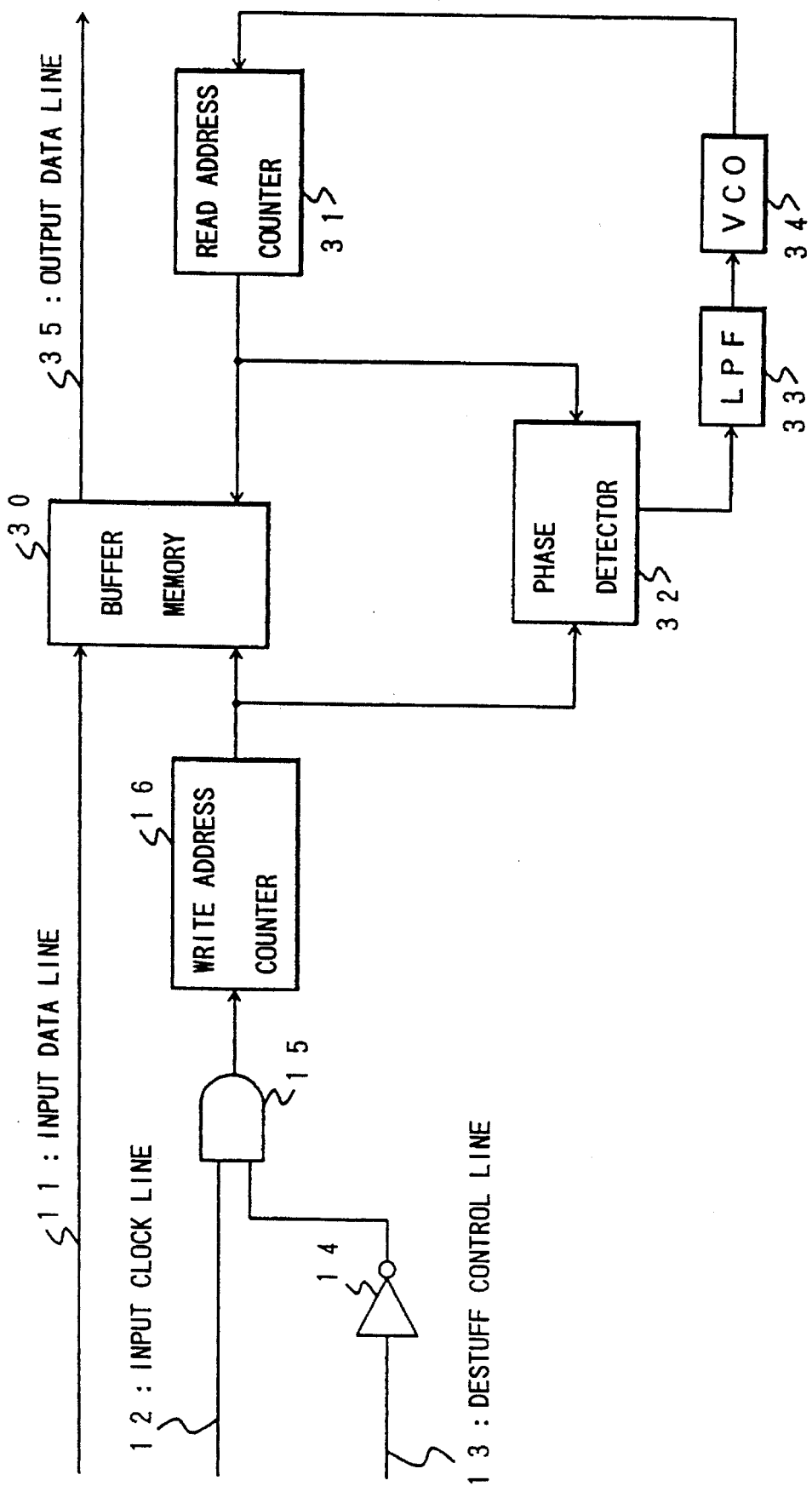
FIG. 3 shows a block diagram of a prior art.

Now referring to FIG. 1, destuffed channel data are written in the buffer memory 30 just in a same way as described in connection with FIG. 3.

A virtual write address generator 20 generates a virtual write address for writing a virtual data where stuffed dummy data in the channel are supposed to be uniformly distributed in the channel. Output of the read address counter 31 is synchronized to the output of the virtual write address generator 20 through the PLL composed of the phase detector 32, the LPF 33, the VCO 34, and the read address counter 31.

Figure 2:
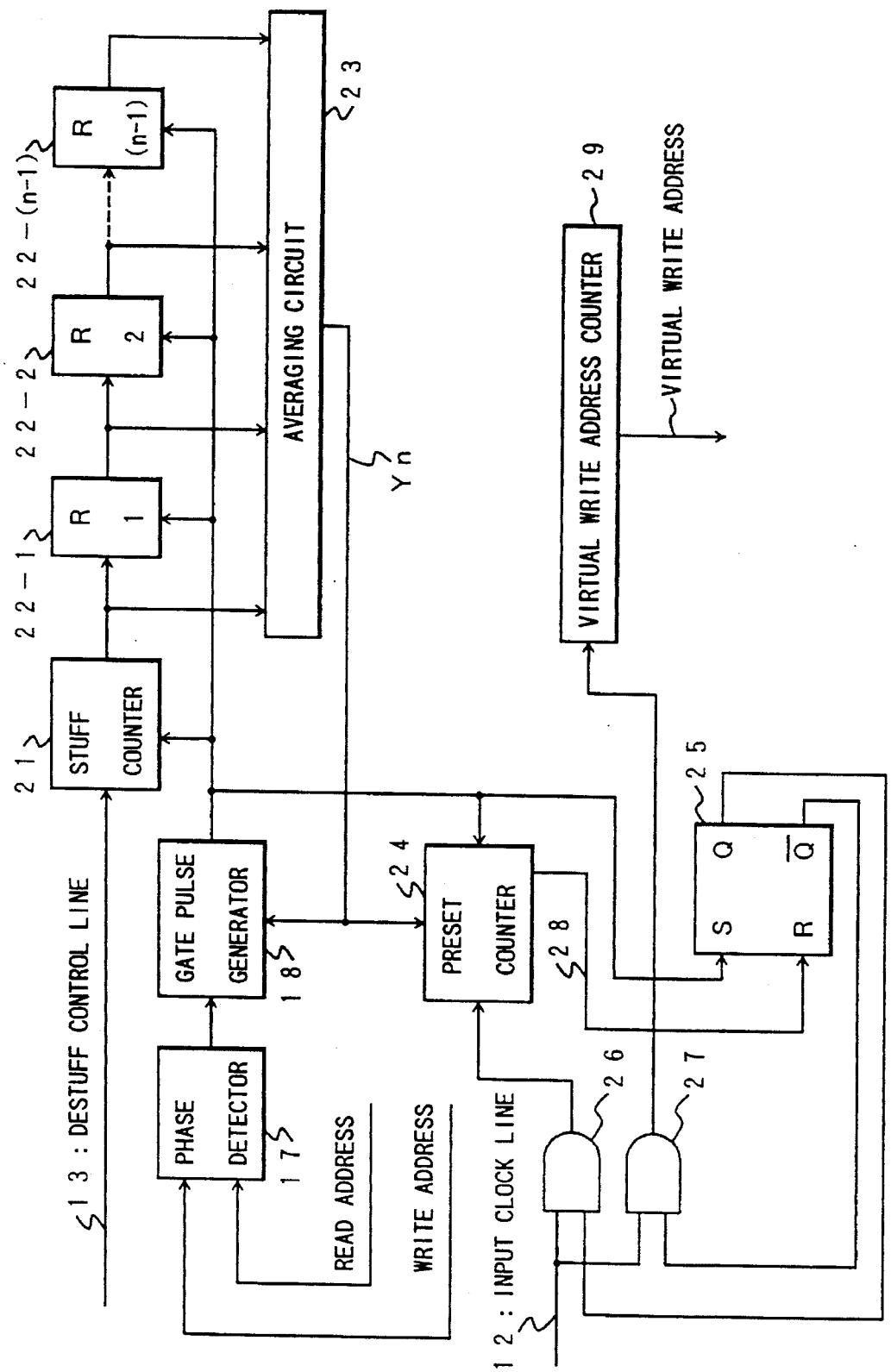
FIG. 2 shows a circuit diagram of a virtual write address generator of FIG. 1.

FIG. 2 is a block diagram illustrating an embodiment of the virtual write address generator 20. A gate pulse generator 18 generates a train of pulses with a pulse repetition period T. For each gate pulse, contents of a (n–2)th register 22-(n–2)(not shown in the drawing) are loaded to a (n–1)th register 22-(n–1) . . . contents of a first register 22-1 are loaded to a second register 22-2, and contents of a stuff counter 21 are loaded to the first register 22-1. Contents of all the registers 22 and the stuff counter 21 are added in an averaging circuit 23 and produces Yn by dividing the sum by n. After the summation, the stuff counter 21 is reset.

Thus, the stuff counter 21 counts number of destuff control signals on the destuff control line 13 in a period T. Thus Yn is the average number of destuff control signals in period T averaged over the latest nT duration.

From the address clock pulses on the input clock line 12, Yn pulses are deleted in each T period. This deletion of Yn pulses is performed by a gate means composed of preset counter 24, a flipflop 25 and gates 26, 27. The average value Yn is preset to the preset counter 24 for each gate pulse from the gate pulse generator 18. Simultaneously, the flipflop 25 is set by the gate pulse. When the flipflop 25 is set, the gate 27 is closed while the gate 26 is opened. Address clock pulses on the input clock line 12 pass the gate 26 and are down counted by the preset counter. When Yn pulses are down counted in the preset counter 24, the count of the preset counter 24 becomes 0, and a signal is delivered on a zero-detect line 28 to reset the flipflop 25. Thus, Yn address clock pulses are deleted for each T period.

When Yn=0, the signal on the zero-detect line 28 appears as soon as Yn is preset to the preset counter 24 and resets the flipflop 25. Thus all the address clock pulses are delivered to a virtual write address counter 29. The output of the virtual address counter 29 changes at each address clock pulse through the gate 27.

The change of the output of the read address counter 31 is phase-locked with the change of the output of the virtual write address counter 29, by the PLL composed of the phase detector 32, the LPF 33, the VCO 34, and the read address counter 31. Since number of destuff control signals are averaged over the latest n cycles of period T in the virtual write address generator 20, jittering of the output data on the output data line 35 is effectively suppressed.

Decimal parts in Yn must be processed, and it has been confirmed that any conventional means of processing of decimal parts can be used in this invention.

The period T must be so determined as to be adapted to an actual occurrence of the destuff control signals. For this purpose, the output Yn of the averaging circuit 24 and output of a phase detector 17 control the gate pulse generator 18.

At a system initialization, a predetermined initial value is set as the period T. For a large value of Yn, T is decreased to obtain a smaller value of Yn, and conversely, for a small value of Yn, T is increased to obtain a larger value of Yn.

The phase detector 17 detects the time lag from the time when a write address is generated at the write address counter 16 to the time when the corresponding read address is generated at the read address counter 31. When the ratio of this time lag to the total time of reading the whole volume of the buffer memory 30 is relatively large (for example, the ratio is about 0.5), T is made larger. When this ratio is small, T must be decreased in order to avoid data skipping which occurs when a read address precedes the corresponding write address.

In an embodiment, T is controlled in a dynamic range from several milliseconds to several seconds.

Heretofore, this invention is described in connection with P-stuff, but it must be understood that this invention can be used in N-stuff, when insertion of dummy data is modified to deletion of dummy data, and deletion of dummy data is modified to insertion of dummy data.

What is claimed is:

1. A destuff circuit comprising:

a buffer memory for temporarily storing received data of a channel after stuffed dummy data are eliminated from received data;

a read address counter for generating read address signals for reading data stored in said buffer memory; and a virtual write address generator for generating a virtual write address signal based on an average value Yn wherein total number of destuff control pulses in a period T is assumed to be said average value Yn of actually occurred destuff control pulses over the latest n periods (that is in a duration nT), and change of output of said read address is phase-locked with change of output of said virtual write address generator.

2. A destuff circuit of claim 1, wherein said virtual write address generator comprises:

a gate pulse generator for generating a train of pulses with a pulse repetition period T;

means for producing an averaged number Yn of destuff control pulses included in said received data for each period of T, averaged over latest nT duration;

gate means for deleting Yn clock pulses in each cycle of T, from address clock pulses generated by bit clocks extracted from received digital signals of said channel, and a virtual write address counter for counting output pulses from said gate means.

3. A destuff circuit of claim 2, wherein said period T generated by said gate pulse generator is controlled by said averaged number Yn, and by output of a phase detector for detecting time lag from a time of generation of a write address at said write address counter to a time of generation of a corresponding read address at said read address counter.

4. A destuff circuit of claim 3, wherein said cycle T produced by said gate pulse generator is controlled in a range from several milliseconds to several seconds.

5. A destuff circuit comprising:

a buffer memory for temporarily storing received data of a channel after stuffed dummy data are eliminated from received data;

a read address counter for generating read address signals for reading data stored in said buffer memory;

a gate pulse generator for generating a train of pulses with a pulse repetition period T;

means for producing an averaged number Yn of destuff control pulses included in said received data for each cycle of T, averaged over latest nT duration;

gate means for deleting Yn clock pulses in each period of T, from address clock pulses generated by bit clocks extracted from received digital signals of said channel;

a virtual write address counter for counting output pulses from said gate means; and means for controlling said period T by said averaged number Yn, and by output of a phase detector for detecting time lag from a time of generation of a write address at said write address counter to a time of generation of a corresponding read address at said read address counter, T being increased when Yn is small and T being decreased when said time lag is small.

* * * * *